(12) United States Patent
Otto et al.

(10) Patent No.: US 12,432,234 B2
(45) Date of Patent: Sep. 30, 2025

(54) DECISION SUPPORT FOR ANOMALY DETECTION VIA IMPACT ANALYSIS FOR SECURITY AND SAFETY

(71) Applicant: Siemens Corporation, Iselin, NJ (US)

(72) Inventors: Martin Otto, West Windsor, NJ (US); Anant Kumar Mishra, Charlotte, NC (US)

(73) Assignee: Siemens Corporation, Washington, DC (US)

( * ) Notice: Subject to any disclaimer, the term of this patent is extended or adjusted under 35 U.S.C. 154(b) by 331 days.

(21) Appl. No.: 17/726,957

(22) Filed: Apr. 22, 2022

(65) Prior Publication Data

US 2022/0345475 A1 Oct. 27, 2022

Related U.S. Application Data

(60) Provisional application No. 63/178,682, filed on Apr. 23, 2021.

(51) Int. Cl.
*H04L 9/40* (2022.01)
(52) U.S. Cl.
CPC ...... *H04L 63/1425* (2013.01); *H04L 63/1416* (2013.01)

(58) Field of Classification Search
CPC .................. H04L 63/1425; H04L 63/1416
See application file for complete search history.

(56) References Cited

U.S. PATENT DOCUMENTS

| | | | |
|---|---|---|---|
| 2020/0358792 A1* | 11/2020 | Bazalgette | G06N 20/00 |
| 2021/0203572 A1* | 7/2021 | Tanaka | H04L 43/067 |
| 2021/0344726 A1* | 11/2021 | Sharifi Mehr | H04L 63/1425 |

* cited by examiner

*Primary Examiner* — Khoi V Le

(57) ABSTRACT

A method for providing cybersecurity to an industrial system having multiple components includes monitoring communications across the components of the system and detecting a deviation in an expected communication state in a first component. Upon detection of a deviation, communication states of at least one other component in the system is observed. If a deviation is also detected in the other component, then the deviation is deemed to be unauthorized. If no other deviations are detected in other components, the original deviation is deemed to be benign. Detecting a deviation includes comparing an expected communication state based on a baseline to the current communication state, the communication state may be based on a communication's content or a pattern of communication actions.

12 Claims, 4 Drawing Sheets

DECISION SUPPORT FOR ANOMALY DETECTION VIA IMPACT ANALYSIS FOR SECURITY AND SAFETY

CROSS-REFERENCE TO RELATED APPLICATIONS

This application claims priority to U.S. Provisional Application Ser. No. 63/178,682 filed Apr. 23, 2021, which is incorporated by reference herein in its entirety.

TECHNICAL FIELD

This application relates to industrial systems. More particularly, this application relates to security measures for industrial systems.

BACKGROUND

When software or hardware components get replaced or updated, the communication patterns of these components may change. This change may be benign and indicative of changed or added features. However, it may also be an indication of a compromised supply chain of malicious nature (for example, incidents like the SolarWinds hack). This is a problem, especially when software gets updated automatically, i.e., without user interaction or validation. It is also a problem for hardware components in critical environments (e.g., nuclear power plants, military vessels, etc.), which happens when old parts need to be replaced by new components due to unavailability because an original manufacturer is out of business. In Operation Technology (OT), with long component lifetimes, this is a significant and relevant problem.

State of the art attack detection techniques perform behavior-based monitoring of communications, both content and patterns. This approach requires a learning phase to identify a benign baseline. However, when a component is updated, the new resulting communication pattern will not adhere to the established baseline. To avoid an excessive number of incorrect alerts (false positives), a new baseline needs to be learned. Otherwise, a very high number of false positives should be expected, potentially overwhelming response capabilities and inducing alert fatigue. Systems that can distinguish between benign changes and malicious behavior are desired.

SUMMARY

A computer-implemented method for providing cybersecurity in a system comprising a plurality of components according to embodiments of this disclosure includes monitoring communications occurring in the system and detecting a deviation in communications relating to a first component of the system. When a deviation is detected communications in at least one other component are observed. The existence of a threat is determined based on the communications of the at least one other component.

Monitoring communications in the system maybe based on the content of the communication and/or the pattern of the communications in the system. When observing other components, the components are selected based on interactions of the other components with a communication from the first component or if the other component consumes a communication from the first component. In response to the detection of a deviation an alert may be generated. The generated alert may be provided to a user of the system or communicated to a selected component of the system. The generated alert is analyzed and acted upon (Alert Triage/Incident Response), and, together with respective metadata of alerts, may be utilized for model training and baseline calibration. For example, the selected component is an industrial controller. A corrective action in response to the identification of the existence of a threat may be taken.

Deviation in the communication state of a component of the system may be identified by comparing a known benign baseline representing the expected communication state or pattern of one or more components that communicate with or consume data from the device in focus with their actual communication state or pattern, and detecting a deviation based on the comparison. Generated alerts may be assigned a low priority on a condition that a deviation in a communication state or pattern of the first component is detected, and no deviation in a communication state of the at least one other component is observed or a high priority when a deviation in a communication state of the first component is detected, and further that a deviation in a communication state of the at least one other component is observed as well.

Systems for providing cybersecurity including a plurality of components include a computer-based cybersecurity system having a processor and memory containing software instructions which cause the computer-based cybersecurity system to perform the steps of the methods above.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

As discussed above, when a change occurs in the communication pattern of a component, a new baseline of benign behavior must be learned. However, since the change in baseline can only be learned from an updated component, there is no assurance that the new behavior to be learned is a legitimate change, or if the new behavior is the result of the component already being compromised. In such a case, a benign baseline cannot be reliably learned from the communication pattern. While approaches like reinforcement learning allow adaptation to a learned baseline, if the input data is already malicious, then malicious behavior will be learned and considered normal by the algorithm. Under ordinary controlled circumstances, significant testing is performed prior to deployment, and a benign baseline is established in a controlled lab environment under operator-in-loop data preparation & testing scenarios. This creates a challenge in that the lab environment must accurately represent the variabilities and fidelity of the intended operational environment to ensure that the correct benign baseline is learned. In the case of highly sensitive environments or outdated technology, this presents significant challenges. Embodiments described in this disclosure propose to solve the aforementioned problem by adding context derived from metadata and domain-centric parametrization practices to detected deviations from the original benign baseline. This context is derived by observing deviations of other systems or components that interact with or consume data from the observed device such as an updated or replaced component and compare the reactions on interactions or data consumption of the other systems or components to a corresponding established benign baseline for their respective behavior. If the behavior of the other system or component does not indicate any undesirable behavior, such as behavior representative of a detriment to safety or an indication of a security exposure, the communication pattern may be considered benign. In response the cybersecurity system may assign a very low risk to an associated alert and select to not present the low priority alert to analysts. If after a sufficient time period has elapsed the communication pattern does not result in any anomalies of surrounding systems, the new communication pattern may be accepted as a new updated benign baseline. Conventional cybersecurity systems do not develop new baselines based on measurements of the behavior of larger systems, or that may be applied to solve supply chain security issues in a similar manner.

Figure 1:
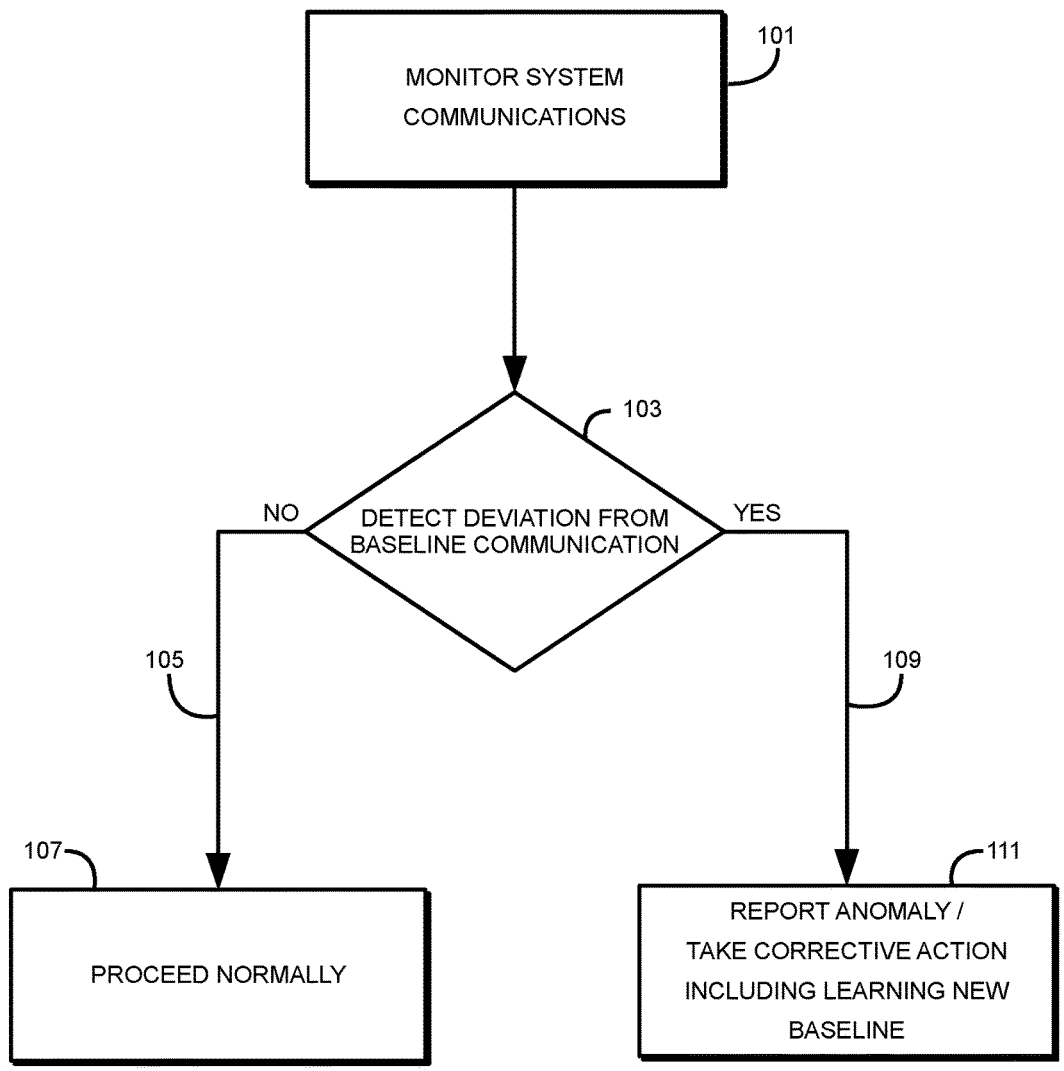
FIG. 1 is a process flow diagram of a conventional cybersecurity system.

FIG. 1 is a process flow diagram of a conventional cybersecurity system. The system is monitored for communication characteristics including communication content and patterns 101. The monitor compares the current communication states to a previously learned baseline pattern 103 for each component in the system. If a deviation is detected from the learned baseline 109 the cybersecurity system may report an anomaly via an alert, or may take some other corrective action, such as taking the affected component offline 111. If it is determined that the deviation is benign, corrective action 111 may include learning the new communication state as an updated benign baseline. If no deviation is detected from the learned baseline 105, then operations may proceed normally 107.

Figure 2:
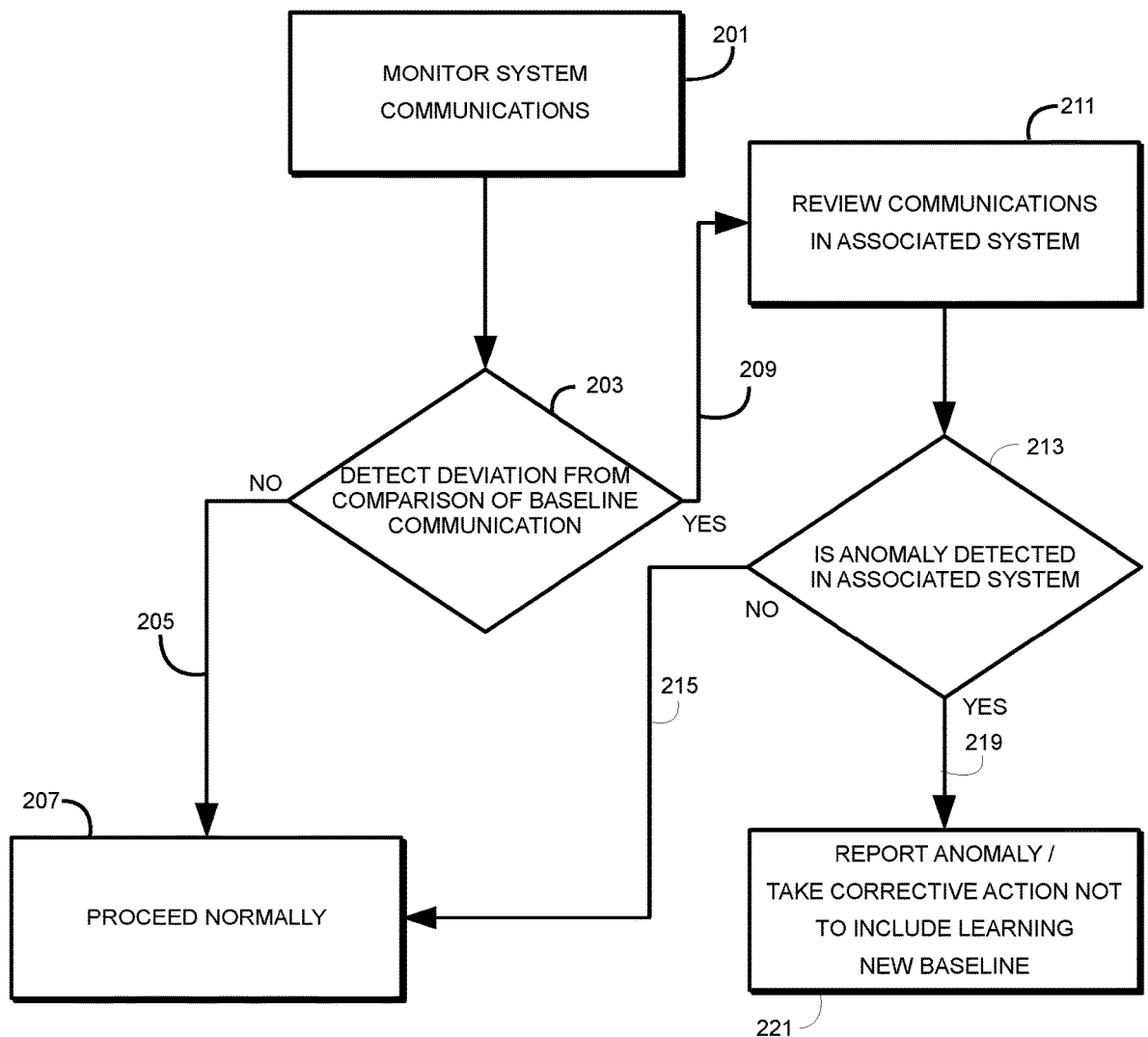
FIG. 2 is a process flow diagram of a cybersecurity system according to embodiments of this disclosure.

FIG. 2 is a process flow diagram for an improved cybersecurity system according to embodiment of this disclosure. A cybersecurity system monitors system communication states, including content and patterns of communications between components of the system, or between the system and other external systems. The cybersecurity system compares the monitored communication states to a previously learned benign baseline 203 and if no deviation from the benign baseline occurs 205, operation of the system proceeds normally 207. However, if a deviation is detected 209 the cybersecurity system reviews the communication states of an associated system or component 211.

If an anomaly is detected in the associated system or component 213, the anomaly is reported via an alert and corrective action is taken 221. The corrective action will not include learning the new communication state as it may be assumed that the original deviation in communication state was of a malicious or unauthorized origin. If after a deviation in the first component is detected 209, but no anomaly is detected in an associated system 213, then operation may proceed normally 207. Once it is determined that the original deviation is not propagated to an associated system, it may be assumed that the change was benign, and the new communication state may be learned to define a new updated benign baseline.

Figure 3:
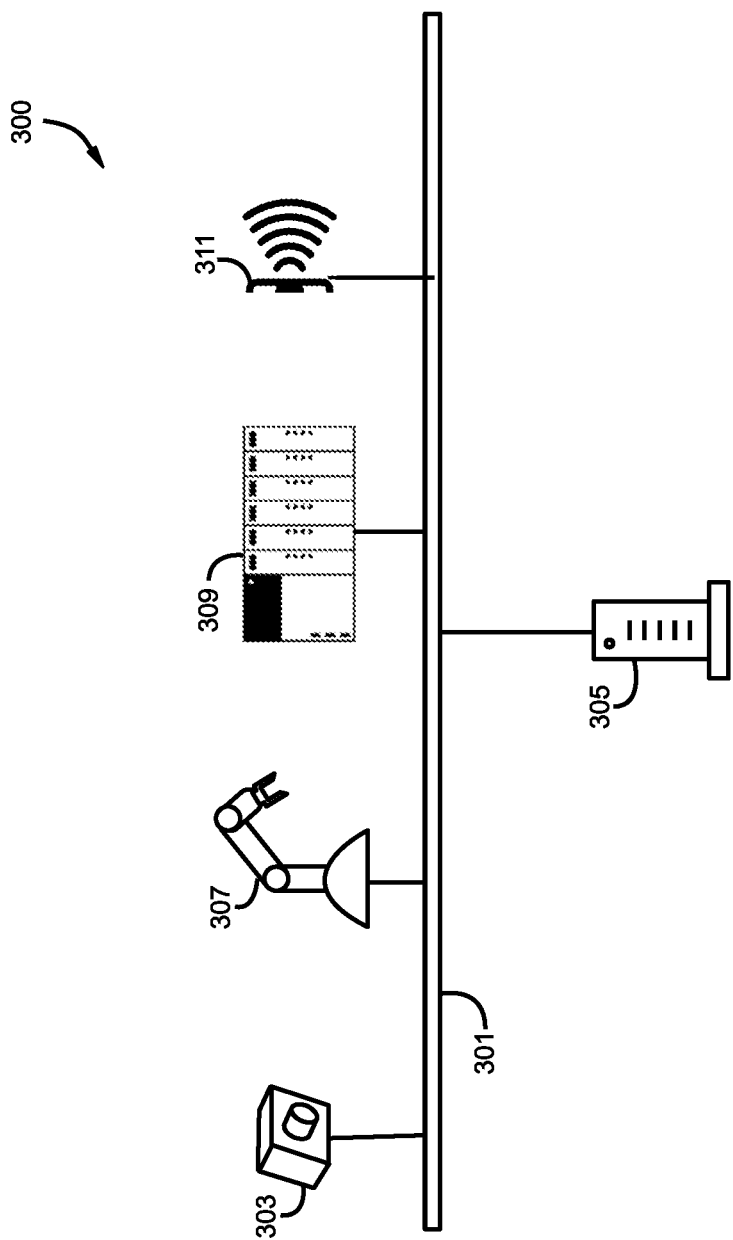
FIG. 3 is an illustration of a manufacturing system including a cybersecurity system according to embodiments of this disclosure.

FIG. 3 is a diagram of a manufacturing system 300 according to aspects of embodiments of this disclosure. Within the manufacturing system 300, there is a camera 303, a manufacturing robot 307, a system controller 309 (e.g., a programmable logic controller (PLC)), a sensor 311, and a cybersecurity system 305. Each component of the system is in communication via a communication channel 301. The communication channel may be implemented in a network, which may be a wired or wireless network. Additionally, system 300 may be connected to other systems through an inter-network. An example of an inter-network may be the Internet or an entity's wide area network (WAN).

The manufacturing system 300 includes devices such as camera 303 and sensor 311, which capture data relating to the system and communication the acquired data through communication channel 301. The cybersecurity system 305 may be configured to monitor the communications that travel though the communication channel 301. For example, camera 303 may capture a manufacturing state of a product being worked on by industrial robot 307. The captured images from camera 303 may be communicated through communication channel 301 to an input port on controller 309. The controller may perform additional processing of the captured data and produce a control signal that is communicated to the industrial robot 307 and causes an actuator in the industrial robot 307 to perform a desired action. Other sensors 311 may perform similar functions by capturing particular classes of data and communicating that data to the control 309. The interactions between the various system components are monitored by the cybersecurity system 305.

During normal operations, each component's communications are monitored for both content and patterns. Observation over time allows the cybersecurity system 305 to learn a baseline communication state that is representative of normal operations. If a deviation occurs in one component's communication state, the cybersecurity system 305 may observe other components in the manufacturing system 300 to determine if their communication states have varied from their respective baselines. If an anomaly is detected in a second component, it may be assumed that the original deviation was benign and not the result of an unauthorized change to the first component. If there is no change to other components when a deviation is detected in a first component, then it may be assumed that the deviation was not caused by unauthorized access but was more likely the result of a benign change such as an update or replacement of the first component.

Consider camera 303 operating in manufacturing system 300. Over time camera 303 captures images relating to the manufacturing process and provides captured images to controller 309. It may be further considered that during the elapsed time that camera 303 provided the images to the controller 309 in a digital image format such as portable network graphic (.png) files. Cyber-security system 305 learns that camera 303 typically sends PNG digital image files to controller 309.

Now assume at some point, a firmware update becomes available for camera 303. The update is applied to the camera 303. The update may be initiated by an automated and unattended process or may be initiated by a user. After the firmware update, camera 303 begins transmitting images in a joint photographic experts' group (JPEG) format to the controller 309. When the cybersecurity system 305 detects the variation in the file format being communicated by camera 303, the deviation causes the cybersecurity system 305 to observe the communication state of other components in the influence zone of the system. For example, the communication state of controller 309, which is consuming data from camera 303 may be observed. If controller 309 continues to operate according to its learned benign baseline, that is controller 309 continues producing appropriate control signals despite the change in image file format as inputs, it may be assumed that the deviation was caused by a harmless event, such as the update of firmware in the camera 303.

On the other hand, if the deviation in file format was detected and the communication state of controller 309 was observed where unexpected communications from controller 309 began when the deviation occurred, then it may be assumed that the initial change to camera 303 was unauthorized or malicious. For example, it might be observed that controller 309 begins to generate incorrect control commands, which cause industrial robot 307 to misbehave. In another example, it may be observed that controller 309 begins receiving the new image format and initiates a new line of communication to an off-site server. This could indicate that a hacker has gotten access to the camera 303 or controller and installed malicious code designed to steal proprietary information from the manufacturing system 300. If an unauthorized or malicious operation is detected, an alert may be generated from cybersecurity system 305 and communicated to a system operator. Additionally, corrective action such as shutting down one or more components, or restricting access to networked resources outside a secured area may be implemented.

Cybersecurity system 305 may be implemented in a computing device having a computer processor and a memory in communication with the computer processor. The memory stores instructions for performing cybersecurity functions to protect the manufacturing system 300. The computer instructions include software modules to cause the computer processor to perform as a specialized computer for performing cybersecurity measures according to embodiments of this disclosure. A communication monitoring module monitors communications between components in the manufacturing system 300. Aspects of the monitoring module may include instructions for performing learning of expected communications content and patterns that identify normal operating conditions. Machine learning may be used to receive communications, extract patterns, build datasets for relevant metadata and predict expected interactions with the communication to produce a benign baseline for each component.

A comparison module within cybersecurity system 305 compares an expected interaction based on the learned benign baseline, with actual interactions in the system, and detects deviations from the expected baseline behavior.

If the comparison module detects a deviation in the expected communications content or pattern, the comparison module communicates the deviation to an observation module. The observation module begins observing the communication behaviors of components associated with the component where the deviation from the baseline was detected. If a change occurs in an associated component, it may be assumed that the initial deviation was caused by an unauthorized access, if no further changes occur in response to the original deviation, it may be assumed that the deviation was caused by a benign action.

If an unauthorized or malicious action is suspected, an alert module produces an alert and communicates the alert to initiate corrective action. For example, a signal may be provided to the controller 309 to shut down the affected component, or to shut down the manufacturing system 300 if necessary.

Figure 4:
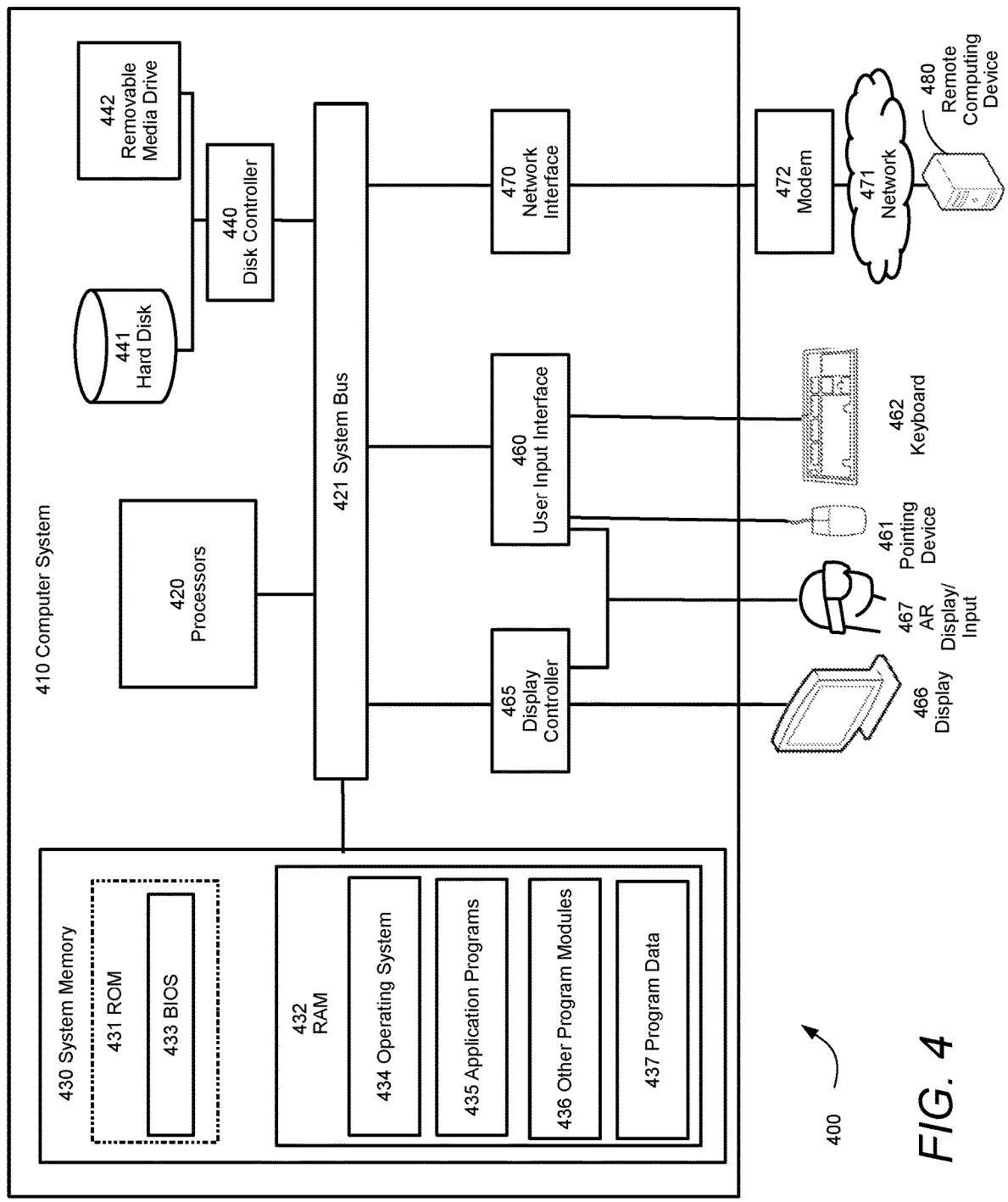
FIG. 4 is a computer system that may implement cybersecurity systems according to embodiments of this disclosure.

FIG. 4 illustrates an exemplary computing environment 400 within which embodiments of the invention may be implemented. Computers and computing environments, such as computer system 410 and computing environment 400, are known to those of skill in the art and thus are described briefly here.

As shown in FIG. 4, the computer system 410 may include a communication mechanism such as a system bus 421 or other communication mechanism for communicating information within the computer system 410. The computer system 410 further includes one or more processors 420 coupled with the system bus 421 for processing the information.

The processors 420 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting, or transmitting information for use by an executable procedure or an information device, and/or by routing the information to an output device. A processor may use or comprise the capabilities of a computer, controller, or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 4, the computer system 410 also includes a system memory 430 coupled to the system bus 421 for storing information and instructions to be executed by processors 420. The system memory 430 may include computer readable storage media in the form of volatile and/or nonvolatile memory, such as read only memory (ROM) 431 and/or random-access memory (RAM) 432. The RAM 432 may include other dynamic storage device(s) (e.g., dynamic RAM, static RAM, and synchronous DRAM). The ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system 433 (BIOS) containing the basic routines that help to transfer information between elements within computer system 410, such as during start-up, may be stored in the ROM 431. RAM 432 may contain data and/or program modules that are immediately accessible to and/or presently being operated on by the processors 420. System memory 430 may additionally include, for example, operating system 434, application programs 435, other program modules 436 and program data 437.

The computer system 410 also includes a disk controller 440 coupled to the system bus 421 to control one or more storage devices for storing information and instructions, such as a magnetic hard disk 441 and a removable media drive 442 (e.g., floppy disk drive, compact disc drive, tape drive, and/or solid-state drive). Storage devices may be added to the computer system 410 using an appropriate device interface (e.g., a small computer system interface (SCSI), integrated device electronics (IDE), Universal Serial Bus (USB), or FireWire).

The computer system 410 may also include a display controller 465 coupled to the system bus 421 to control a display or monitor 466, such as a cathode ray tube (CRT) or liquid crystal display (LCD), for displaying information to a computer user. The computer system includes an input interface 460 and one or more input devices, such as a keyboard 462 and a pointing device 461, for interacting with a computer user and providing information to the processors 420. The pointing device 461, for example, may be a mouse, a light pen, a trackball, or a pointing stick for communicating direction information and command selections to the processors 420 and for controlling cursor movement on the display 466. The display 466 may provide a touch screen interface which allows input to supplement or replace the communication of direction information and command selections by the pointing device 461. In some embodiments, an augmented reality device 467 that is wearable by a user, may provide input/output functionality allowing a user to interact with both a physical and virtual world. The augmented reality device 467 is in communication with the display controller 465 and the user input interface 460 allowing a user to interact with virtual items generated in the augmented reality device 467 by the display controller 465. The user may also provide gestures that are detected by the augmented reality device 467 and transmitted to the user input interface 460 as input signals.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium, such as a magnetic hard disk 441 or a removable media drive 442. The magnetic hard disk 441 may contain one or more datastores and data files used by embodiments of the present invention. Datastore contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processors 420 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 441 or removable media drive 442. Non-limiting examples of volatile media include dynamic memory, such as system memory 430. Non-limiting examples of transmission media include coaxial cables, copper wire, and fiber optics, including the wires that make up the system bus 421. Transmission media may also take the form of acoustic or light waves, such as those generated during radio wave and infrared data communications.

The computing environment 400 may further include the computer system 410 operating in a networked environment using logical connections to one or more remote computers, such as remote computing device 480. Remote computing device 480 may be a personal computer (laptop or desktop), a mobile device, a server, a router, a network PC, a peer device, or other common network node, and typically includes many or all of the elements described above relative to computer system 410. When used in a networking environment, computer system 410 may include modem 472 for establishing communications over a network 471, such as the Internet. Modem 472 may be connected to system bus 421 via user network interface 470, or via another appropriate mechanism.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computing device 480). The network 471 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite, or any other wireless connection methodology generally known in the art. Additionally, several networks may work alone or in communication with each other to facilitate communication in the network 471.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A computer-implemented method for providing cybersecurity in a system comprising a plurality of components, the method comprising:
   monitoring communications occurring in the system, so as to define monitored communications;
   capturing data of the system during normal operations of the system and building a benign baseline based on the data;
   making a comparison of the monitored communications to the benign baseline representing an expected state of a first component of the plurality of components;
   based on the comparison, detecting a deviation in communications relating to the first component of the plurality of components;
   observing communications of a second component of the plurality of components in response to the detection of the deviation, so as to define observed communications of the second component; and
   when the observed communications of the second component indicate an anomaly, determining an existence of a threat to the system based on the observed communications of the second component that is different than the first component.

2. The computer-implemented method of claim 1, further comprising:
   monitoring communications in the system based on at least one of the content of the communication and the pattern of the communications.

3. The computer-implemented method of claim 1, wherein the second component interacts with a communication from the first component.

4. The computer-implemented method of claim 1, wherein the second component consumes a communication from the first component.

5. The computer-implemented method of claim 1, further comprising:
   generating an alert based on the identification of the existence of the threat.

6. The computer-implemented method of claim 5, further comprising:
   communicating the generated alert to a user of the system.

7. The computer-implemented method of claim 5, further comprising:
   communicating the generated alert to a selected component of the system.

8. The computer-implemented method of claim 7, wherein the selected component is an industrial controller.

9. The computer-implement method of claim 1, further comprising:
   initiating a corrective action in response to the identification of the existence of the threat.

10. The computer-implemented method of claim 1, further comprising:
    generating an alert having a low priority on a condition that a deviation in a communication state of the first component is detected, and no deviation in a communication state of the second component is observed.

11. The computer-implemented method of claim 1, further comprising:
    generating an alert having a high priority on a condition that a deviation in a communication state of the first component is detected, and further that a deviation in a communication state of the at least one other component is observed.

12. A system providing a plurality of components in communication with each other, and a cybersecurity system comprising:
    a computer processor;
    a sensor configured to capture data of the system during normal operations of the system; and
    a memory in communication with the computer processor containing executable instructions that when executed by the processor cause the processor to:
    build a benign baseline based on the data captured during normal operations of the system;
    monitor communications occurring in the system, so as to define monitored communications;
    make a comparison of the monitored communications to a benign baseline representing an expected state of a first component of the plurality of components;
    based on the comparison, detect a deviation in communications relating to the first component of the system;
    observe communications of a second component of the plurality of components in response to the detection of the deviation, so as to define observed communications of the second component; and
    when the observed communications of the second component indicate an anomaly, determine an existence of a threat to the system based on the observed communications of the second component that is different than the first component.

* * * * *